Oct. 16, 1951  G. E. CONOVER ET AL  2,571,839
INDEX FOR SENSITIVE MEASURING INSTRUMENTS
Filed Dec. 3, 1947  3 Sheets-Sheet 1
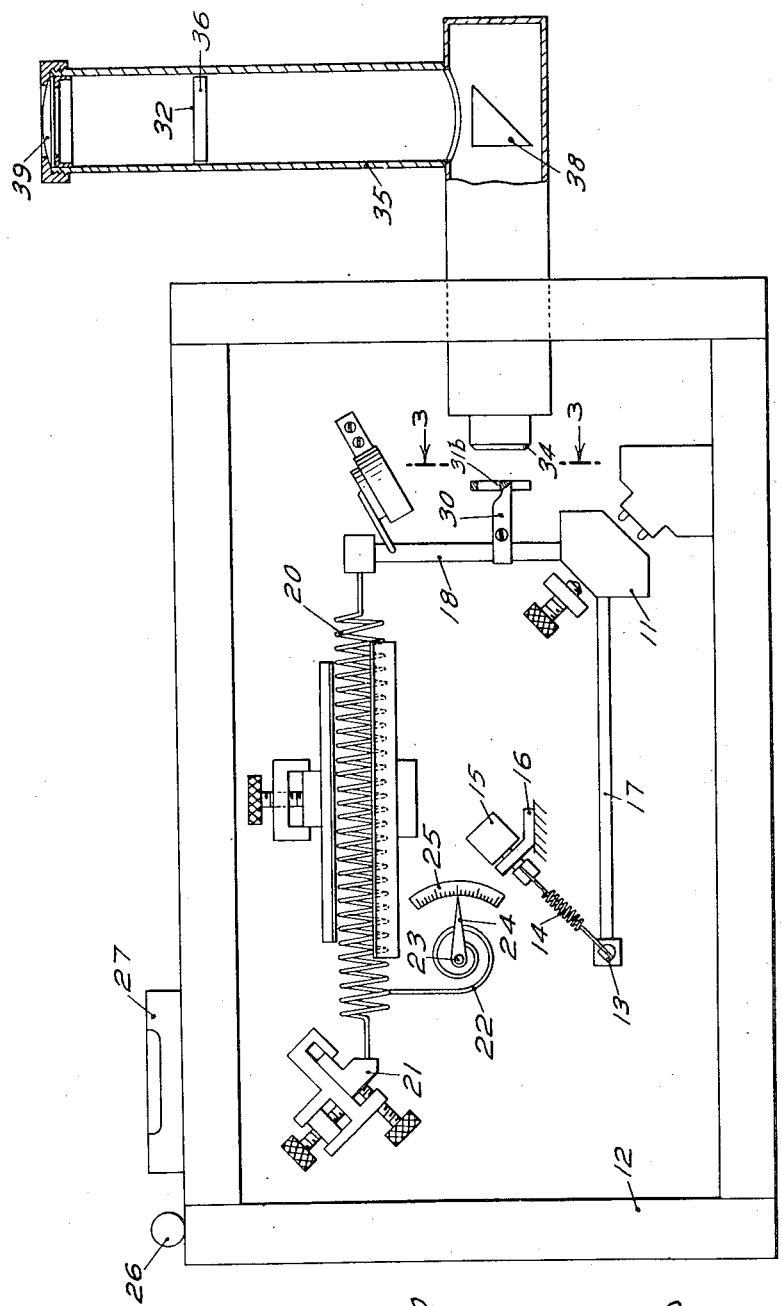
INVENTORS
CARROLL D. MCCLURE
GEORGE E. CONOVER
BY
Sidney A. Johnson
ATTORNEY

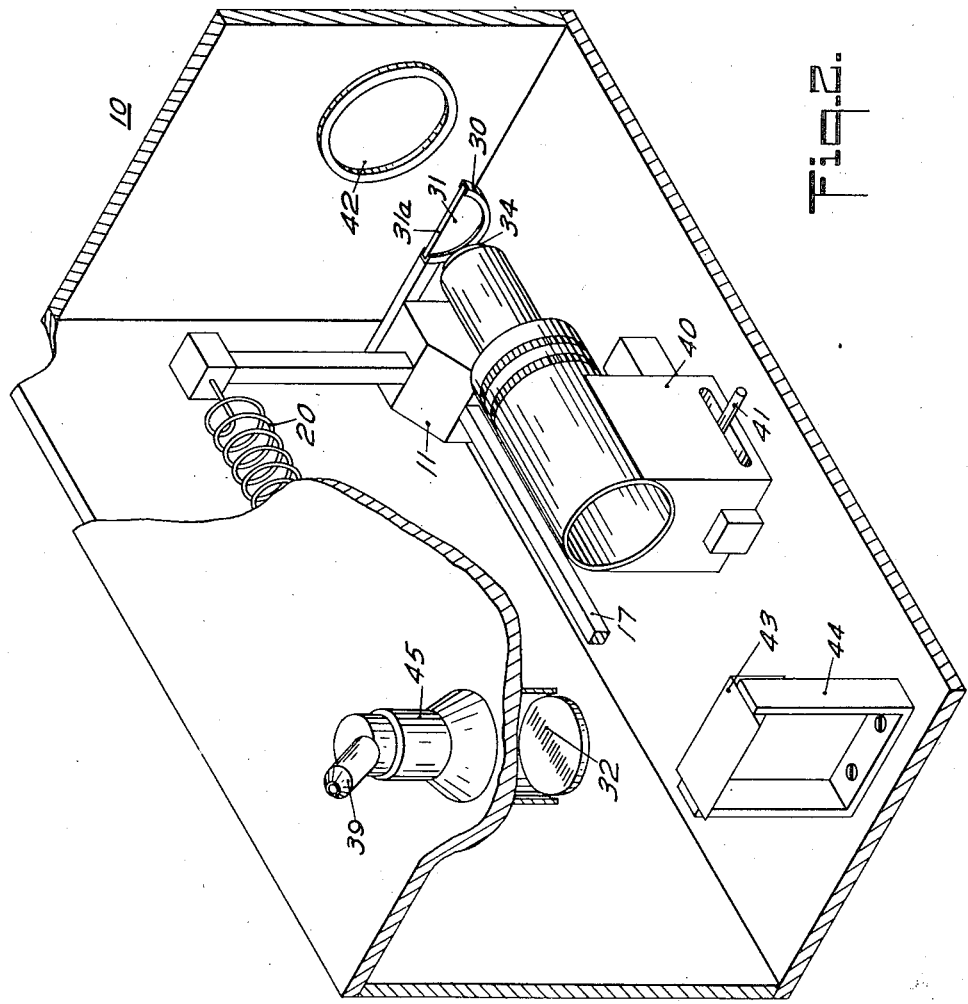

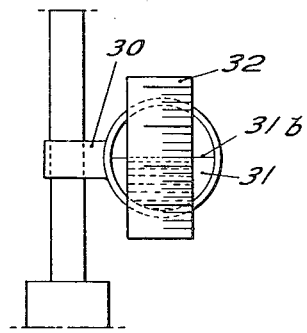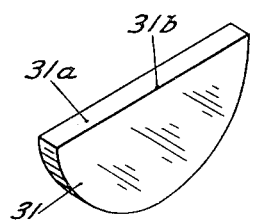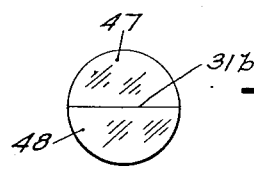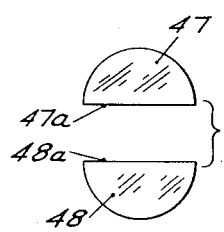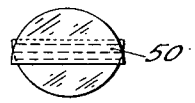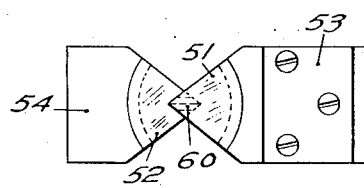

Patented Oct. 16, 1951

2,571,839

UNITED STATES PATENT OFFICE 2,571,839

INDEX FOR SENSITIVE MEASURING INSTRUMENTS

George E. Conover, Garland, and Carroll D. McClure, Dallas, Tex., assignors, by mesne assignments, to Socony-Vacuum Oil Company, Incorporated, a corporation of New York Application December 3, 1947, Serial No. 789,484

3 Claims. (Cl. 116—136.5)

1

This invention relates to sensitive measuring instruments of the type in which the movement of a movable part may be so small as to require high magnification thereof in order to be perceptible to the observer. In sensitive instruments which require high magnification of the movable part, there arises the problem of providing an index carried by the movable part which, when subjected to high magnification, does not obscure or prevent accurate reading of the graduations of an associated scale. Heretofore the index movable across the scale has ordinarily taken the form of a very fine wire or filament. However, even with the finest filament of requisite strength, a substantial magnification has increased the apparent diameter beyond the width of the scale graduations.

It is an object of the present invention to provide an index which will appear as a fine line regardless of the magnification applied thereto and which remains as a fine line with a magnification of 400 diameters or more.

While the invention may be applied to many types of sensitive instruments such as torsion balances and the like, it is particularly useful in connection with gravity meters. There is utilized in one form of the invention, an index comprising a light-transmitting element, one edge of which is highly polished to form, even under magnification, a line of substantially zero width. Thus, if the elongated edge of a piece of light transmitting material, hereinafter referred to as an index element, is highly polished without chipping, and if that edge be viewed from a point within the plane thereof, the edge will form a line of zero width since the line which is seen comprises the juncture of the intersecting planes which are preferably normal to each other. Preferably, the index element with its polished edge, is supported from the movable member of the instrument, such as a gravity meter and is viewed through an optical system which provides a magnification of 400 diameters, more or less. The scale with which the index is associated preferably is included as a part of the optical system; it is preferably projected or viewed under relatively low power, so that the graduations thereof are of a size which may be accurately read in association with the index.

For further objects and advantages of the invention, reference should be had to the following description taken in conjunction with the accompanying drawings, in which:

Fig. 1 is an elevation, partly in section, of one form of a gravity meter and which, more

2 or less diagrammatically, illustrates the invention applied thereto;

Fig. 2 is a perspective view of the essential elements of an optical system embodying the invention, the basic elements of a gravity meter being diagrammatically indicated;

Fig. 3 is a detail view taken on the line 3—3 of Fig. 1;

Fig. 4 is a perspective view of a semicircular light transmitting element embodying the invention;

Figs. 5, 6 and 7 illustrate a further modification of the invention with the parts in several different positions;

Fig. 8 is a perspective view of a further modification of the invention;

Fig. 9 is a view of the indexes of Fig. 8 as viewed from above and when in overlapping position.

Referring to the drawings, the invention in one form has been shown as applied to a gravity meter 10, the essential parts of which include a mass 11 pivotally mounted for rotation in a vertical plane within a housing 12 as by a pair of tension springs 14 and 14a respectively supported at one end by the opposite ends of a rod 13, only one of the springs, the spring 14 being shown. The opposite end of the spring 14 is secured to an adjusting knob 15 journaled in a stationary bracket 16. It is to be understood the corresponding spring 14a on the opposite end of the rod 13 is similarly carried by an adjusting knob supported in a similar stationary bracket. The rod 13 extends through an arm 17 secured to the mass 11. A second arm 18 extends from the mass 11 and has its upper end attached to a pre-tensioned spring 20 which serves to supply elastic forces necessary to maintain the mass structure 11 in equilibrium. The spring 20 is secured to an adjustable anchor 21. To null the instrument, a spiral spring 22 is connected near one end of the spring 20 and to a rotatable shaft 23 which carries a pointer 24 movable relative to a scale 25.

As will be readily understood by those skilled in the art, a gravity meter is an exceedingly sensitive device which, in operation, must be maintained level. The levels 26 and 27 are provided for that purpose. Further, it must operate at constant temperature, and for this purpose, a suitable temperature-controlling enclosure and system (not shown) is associated with the instrument. Making observation of the force of gravity at one point as compared to another, the variations in that force, as exerted on mass 11, may be, and ordinarily are, minute. The movement of the mass structure will be microscopic. It is necessary to provide an optical system which is the full equivalent of a microscope for highly magnifying the index carried by the movable structure to detect movement thereof.

In accordance with the present invention, there is attached to the arm 18 an index carrier 30 which supports a semicircular index element 31, Figs. 1, 2 and 3, in a position which appears to be behind scale 32. The objective lens 34 of the optical system within the enclosing housing 35 is focused upon the hair-line formed by a highly polished edge 31a of the index element 31, the axis of the objective lens 34 being parallel to the plane of the polished edge 31a. The edge 31a is preferably at right angles to the respective faces of the index element 31, wherein the intersecting planes form a line 31b of zero thickness, this line being the trace of the intersecting planes. This line or trace appears through the microscope as a very thin line even though magnified 400 times or more, and thus for all practical purposes does have a dimension of zero thickness. The image of the index line 31b is focused upon a reference indicium such as a scale or reticle 32 inscribed on glass plate 36, a turn in the viewing tube 35 being made by means of a prism 38. A lens 39 in the eye-piece serves to magnify both the scale 32 and the image of the index line 31b. Thus, the scale 32 may be magnified twenty times by the lens 39 while the index line 31b will be magnified twenty times by the lens 39 and twenty times by the objective lens 34. Of course, other lenses may be included in the optical system and other ranges of magnification may be utilized depending upon the sensitivity of the instrument and the desired magnification in the operation thereof.

With the invention applied as described, there appears across the scale 32 a sharply defined index line 31b which is ordinarily narrower than the graduations of the scale 32. Moreover, since the index element is made of a light transmitting material such as glass, organic or inorganic, the scale beneath it may appear to be shaded or colored, depending upon the material chosen. While clear glass may be used, a tinted or stained element affects a field of vision sharply discontinuous in color at the fine line or index. The difference in apparent illumination or color above and below the index makes the reading of the instrument easier and more accurate than would otherwise be the case. As indicated by broken lines in Fig. 3, that part of the scale covered by the index element 31 appears darkened, as gray, while the scale above the index line 31b, as viewed in Fig. 3, appears white or is much brighter.

For a detailed disclosure of a suitable gravity meter to which the invention may be applied, reference may be had to Clewell Patent No. 2,337,152 and to the Clewell et al. Patent 2,355,421.

The essential elements of the optical system of Fig. 3 of said Clewell et al. Patent No. 2,355,421 have been shown in perspective in Fig. 2, while the parts of the gravity meter itself have been only generally indicated.

Referring to Fig. 2, where corresponding parts have been given the same reference characters as in Fig. 1, the index element 31 comprising the piece of light transmitting material with the highly polished edge 31a is supported from the gravity meter mass 11 as by an index carrier 30 extending therefrom. The objective lens 34 of the microscope is adjustably mounted in a housing 40, and adjusting means, not shown, is provided to focus an image of index 31a on scale 32. Light entering the gravity meter from an opening 42 in the housing 40 passes the index element 31, thence through the objective lens 34 of the microscope and to the vertical face of a prism 43. The prism mounted in a bracket 44 reflects the light vertically through a viewing tube 45. The objective lens 34 of the microscope is adjusted to bring the image of the polished-edge 31b of index element 31 to focus on scale 32 inscribed upon a disk of glass or other suitable material. The viewing tube includes the lens 39 which is focused upon the disk for magnification of both the image of the index line 31b and the scale 32. Movement of the index element 31 in a vertical plane, due to minute changes in the position of the mass 11, results in a movement of the image of line 31b thereof projected on the scale 32. If the null position is assumed to coincide with the center of the scale 32, then movement of the polished-edge index element 31 above or below its null position will cause movement of the projected image thereof to the right or to the left of the center of scale 32. Accordingly, an observer or operator will know that the tension in the gravity spring 20 must be increased or decreased to return the index element 31 to its null position.

Since the gravity meter in the form to which the invention has been applied is essentially a null instrument, it is only necessary to ascertain the null position of the mass 11; in other words, an operator or observer is not interested in the degree of deflection of the mass from the null position but only in the degree of adjustment of the gravity spring 20 which will return the mass 11 to its null or predetermined position after deflection therefrom, due to a change in the gravitational force, occasioned by the location of the instrument to a different station. As more fully explained in the aforesaid Clewell patents, the change in the tension or force of the spring 20 may be determined by means of a counter, not shown, associated with the adjusting means for the auxiliary spring 22, Fig. 1.

With the foregoing in mind, reference may now be had to Figs. 5-7 where there has been illustrated a modified form of the invention with the parts in several different positions. More particularly, in Fig. 5 two semicircular index elements 47 and 48 have been illustrated with planes of their respective polished edges 47a and 48a coincident with each other. One of the two, the index element 47, may be supported from the mass 11, while the other index element 48 may be secured to the frame. For other types of instruments, where the members are movable relative to each other, it is to be understood that one index element 47 will be carried by one movable member and the other index element 48 carried by the other movable member. When there is relative movement between the index elements 47 and 48 in one direction, as in Fig. 6, there will be a gap or space 49 between them. Thus, there will be a bright area of scale between the polished edges 47a and 48a and the lines 47a and 48a will be sharply defined across the scale.

Should the relative movement of index elements 47 and 48 be in the opposite direction, the index elements will overlap, as shown in Fig. 7, and the degree of overlap will be sharply indicated by an area 50 which is darker midway of the index elements than in the region where they are not overlapping. As the instrument is nulled, the index elements 47 and 48 are relatively moved until the respective polished edges 47a and 48a lie in the same plane, as shown in Fig. 5. In utilizing this modification of the invention, the index elements 47 and 48 are preferably mounted with a minimum of clearance between the planes of the faces which are adjacent each other. In consequence, the adjacent edges or lines 47a and 48a will remain in focus when magnified to a substantial degree. If the spacing may not be made small, an observer may change the focus of the magnifying system alternately to view the index elements 47 and 48 as adjustments are made to achieve a predetermined relationship between them.

In some instruments or measuring apparatus, it is sometimes desirable to indicate a relative degree of movement of two members which have two degrees of freedom of movement in a plane as contrasted to a single degree of freedom of movement along a line, as in the gravity meter. For such an application, reference may be had to the modification of Fig. 8, wherein there has been illustrated two angularly shaped pieces of light-transmitting material forming index elements 51 and 52 respectively carried by relatively movable instrument members 53 and 54. Though both of the members 53 and 54 may be movable relative to each other, it will be assumed that only the member 53 is movable and that it can be moved in the direction indicated by the double-ended arrow 55 or in the directions at right angles thereto, as indicated by the double-ended arrow 56. As in the case of the modifications of Figs. 5–7, the index elements 51 and 52 must be so mounted, or the focus of the magnifying system must be so varied, as to facilitate observation of the index elements 51 and 52 either simultaneously or alternately. The respective index elements 51 and 52 are angularly shaped with the edges thereof forming the angle polished to a degree where those edges will appear as a line even though highly magnified. As illustrated, the index elements 51 and 52 are not in alignment, and as viewed through the viewing tube 57, without magnification they appear as illustrated in Fig. 9. There is a dark area in the central overlapping portion. Should there be movement of the member 53 in the direction indicated by the arrow 55, the dark area 60 will, of course, decrease in size and will move to the right or to the left. If there is movement in the direction of the arrow 56, the dark area will remain of generally the same shape, but its area will increase or decrease. A null point will preferably be located as one in which the apices do not overlap but coincide with a line extending along the axis of the viewing tube 57.

Though the invention has been illustrated by several preferred modifications thereof, it is to be understood that further modifications within the scope of the appended claims may now suggest themselves to those skilled in the art.

What is claimed is:

1. An index for an optical system for detecting minute movements of a member thereof comprising a light-transmitting element having two faces thereof parallel to each other and one edge thereof perpendicular to said parallel faces, said edge being highly polished for appearance under high magnification as a fine line, said optical system including a scale located in a predetermined position, magnifying means for projecting onto said scale an image of said edge, and an observing means including magnifying lenses for observing the position of said polished edge with reference to said scale.

2. In a system including a microscope for detecting minute displacements of a member relatively movable with respect to said microscope, indexing means for said system comprising a light transmitting element having a highly polished edge, means supporting said element from said member with the plane of said edge normally at and parallel to the axis of said microscope, and a reticle at a low power stage in said microscope and at said axis for observing displacements of said highly polished edge from said axis.

3. In a system including a microscope for detecting minute displacements of a member relatively movable with respect to said microscope, indexing means for said system comprising a light transmitting element having a highly polished edge, means supporting said element from said member with the plane of said edge normally at and parallel to the axis of said microscope, and a reference indicium at a low power stage in said microscope and at said axis for observing displacements of said highly polished edge from said axis.

GEORGE E. CONOVER.
CARROLL D. McCLURE.

REFERENCES CITED

The following references are of record in the file of this patent:

UNITED STATES PATENTS

| Number | Name | Date |
|---|---|---|
| 1,157,796 | Morehouse | Oct. 26, 1915 |
| 1,685,790 | Thomas | Oct. 2, 1928 |
| 1,879,707 | Plechl et al. | Sept. 27, 1932 |
| 2,058,939 | Arey | Oct. 27, 1936 |
| 2,171,571 | Karnes | Sept. 5, 1939 |
| 2,302,572 | Reason | Nov. 17, 1942 |
| 2,401,706 | Mihalyi | June 4, 1946 |
| 2,414,871 | Harper | Jan. 28, 1947 |